United States Patent
Sundar

(10) Patent No.: US 11,068,271 B2
(45) Date of Patent: Jul. 20, 2021

(54) ZERO CYCLE MOVE USING FREE LIST COUNTS

(71) Applicant: Apple Inc., Cupertino, CA (US)

(72) Inventor: Shyam Sundar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 342 days.

(21) Appl. No.: 14/444,798

(22) Filed: Jul. 28, 2014

(65) Prior Publication Data

US 2016/0026463 A1 Jan. 28, 2016

(51) Int. Cl.
*G06F 9/38* (2018.01)
*G06F 9/30* (2018.01)

(52) U.S. Cl.
CPC .......... *G06F 9/384* (2013.01); *G06F 9/30032* (2013.01); *G06F 9/30181* (2013.01)

(58) Field of Classification Search
CPC ....................................................... G06F 9/384
See application file for complete search history.

(56) References Cited

U.S. PATENT DOCUMENTS

| | | |
|---|---|---|
| 5,630,149 A | 5/1997 | Bluhm |
| 5,655,096 A * | 8/1997 | Branigin ............... G06F 9/3836 712/200 |
| 5,751,983 A | 5/1998 | Abramson et al. |
| 5,926,646 A | 7/1999 | Pickett et al. |
| 6,047,369 A * | 4/2000 | Colwell .............. G06F 9/30032 712/217 |
| 6,065,103 A | 5/2000 | Tran et al. |
| 6,094,716 A | 7/2000 | Witt |
| 6,122,656 A | 9/2000 | Witt |
| 6,122,725 A | 9/2000 | Roussel et al. |
| 6,256,721 B1 | 7/2001 | Witt |
| 6,505,293 B1 | 1/2003 | Jourdan et al. |

(Continued)

FOREIGN PATENT DOCUMENTS

| | | |
|---|---|---|
| CN | 1136182 A | 11/1996 |
| EP | 0297265 A2 | 1/1989 |

(Continued)

OTHER PUBLICATIONS

Jourdan, et al., "A Novel Renaming Scheme to Exploit Value Temporal Locality through Physical Register Reuse and Unification" Proceedings of the 31st Annual ACM/IEEE International Symposium on Microarchitecture, Nov. 1, 1998, 10 pages, IEEE Computer Society Press, Los Alamitos, CA, USA.

(Continued)

*Primary Examiner* — Eric Coleman
(74) *Attorney, Agent, or Firm* — Kowert Hood Munyon Rankin and Goetzel PC; Rory D. Rankin

(57) ABSTRACT

A system and method for reducing the latency of data move operations. A register rename unit within a processor determines whether a decoded move instruction qualifies for a zero cycle move operation. If so, control logic assigns a physical register identifier associated with a source operand of the move instruction to the destination operand of the move instruction. Additionally, the register rename unit marks the given move instruction to prevent it from proceeding in the processor pipeline. Further maintenance of the particular physical register identifier may be done by the register rename unit during commit of the given move instruction.

20 Claims, 11 Drawing Sheets

(56) References Cited

U.S. PATENT DOCUMENTS

| | | | |
|---|---|---|---|
| 6,560,671 B1 | 5/2003 | Samra et al. | |
| 6,594,754 B1 * | 7/2003 | Jourdan | G06F 9/30167 712/216 |
| 6,662,280 B1 | 12/2003 | Hughes | |
| 6,701,425 B1 | 3/2004 | Dabbagh et al. | |
| 7,263,600 B2 | 8/2007 | Sander et al. | |
| 7,467,239 B2 | 12/2008 | Nicolai et al. | |
| 2004/0255101 A1 | 12/2004 | Filippo et al. | |
| 2005/0066131 A1 | 3/2005 | Biles et al. | |
| 2005/0091475 A1 | 4/2005 | Sodani | |
| 2005/0138338 A1 | 6/2005 | Sodani et al. | |
| 2008/0059770 A1 | 3/2008 | Garg et al. | |
| 2008/0215804 A1 * | 9/2008 | Davis | G06F 9/30098 711/109 |
| 2010/0153690 A1 * | 6/2010 | Vick | G06F 9/30123 712/217 |
| 2010/0299499 A1 * | 11/2010 | Golla | G06F 9/3851 712/206 |
| 2011/0040955 A1 | 2/2011 | Hooker et al. | |
| 2011/0320785 A1 | 12/2011 | Chen et al. | |
| 2012/0005459 A1 | 1/2012 | Fleischman et al. | |
| 2013/0275720 A1 * | 10/2013 | Keller | G06F 9/30032 712/205 |
| 2013/0297912 A1 * | 11/2013 | Tran | G06F 9/3814 712/208 |
| 2013/0339671 A1 | 12/2013 | Williams, III et al. | |

FOREIGN PATENT DOCUMENTS

| | | | |
|---|---|---|---|
| JP | 2000148488 A | 5/2000 | |
| JP | 2000181715 A | 6/2000 | |
| JP | 2005532613 A | 10/2005 | |
| JP | 2007503661 A | 2/2007 | |
| JP | 2007536626 A | 12/2007 | |
| KR | 1020070019750 | 2/2007 | |
| TW | 201003517 A | 1/2010 | |
| WO | 2003093982 A1 | 11/2003 | |
| WO | 2005111794 A1 | 11/2005 | |
| WO | 2009129052 A1 | 10/2009 | |

OTHER PUBLICATIONS

International Search Report and Written Opinion in International Application No. PCT/US2013/043318 dated Dec. 16, 2013, 11 pages.
Extended European Search Report in European Application No. 13170357.1, dated Jun. 24, 2014, 6 pages.
Akkary, Haitham, et al. "An Analysis of a Resource Efficient Checkpoint Architecture", ACM Transactions on Architecture and Code Optimization, Dec. 2004, pp. 418-444, vol. 1, No. 4, New York, USA.
Notice of Preliminary Rejection in Korean Patent Application No. 10-2013-68008, dated Aug. 18, 2014, 11 pages.
Office Action in Japanese Patent Application No. 2013-125333, dated Oct. 20, 2014, 8 pages.
Office Action in Taiwan Patent Application No. 102120951, dated Mar. 17, 2015, 11 pages.
Final Office Action in Japanese Patent Application No. 2013-125333, dated Jun. 29, 2015, 5 pages.
Decision of Grant in Japanese Patent Application No. 2013-125333, dated Feb. 1, 2016, 3 pages.
Notification of the First Office Action in Chinese Application No. 201310236291.X, dated Jan. 25, 2016, 19 pages.
Notification of the Second Office Action in Chinese Application No. 201310236291.X, dated Sep. 7, 2016, 18 pages.
Kanter, David, "Intel's Sandy Bridge Microarchitecture", Real World Technologies, Sep. 25, 2010, http://www.realworldtech.com/sandy-bridge/, 25 pages. [Retrieved May 14, 2015].

* cited by examiner

ZERO CYCLE MOVE USING FREE LIST COUNTS

BACKGROUND

Technical Field

Embodiments disclosed herein are related to microprocessors, and more particularly, to efficiently reducing the latency and power of data move operations.

Description of the Relevant Art

Microprocessors take advantage of instruction level parallelism (ILP) in source code with multiple techniques. One typical technique includes register renaming. Register renaming is used to allow parallel execution of instructions despite the occurrence of write after read (WAR) or write after write (WAW) data dependencies in a computer program. However, a true dependency, or a read after write (RAW) dependency, will remain. Therefore, architectural registers repeatedly used as a destination register and subsequently as a source register cause serialization of instruction execution for associated source code segments.

One example of a common RAW dependency with an architectural register is assigning a base pointer a value stored in a stack pointer at the beginning of subroutines. A related second example is assigning the stack pointer a value stored in the base pointer to deallocate variables at the end of subroutines. These assignments are performed with move operations. Subroutines reduce the cost of developing large, reliable programs. Therefore, the move operations occur frequently during the execution of programs and include the RAW dependency.

A free list may be used to maintain a list of physical register identifiers to map to software-visible architectural registers. When a source operand is renamed, a previously used physical register identifier may be mapped to the source operand if that mapping is still valid. Otherwise, a new physical register identifier from the free list may be mapped to the source operand. When a destination operand is renamed, typically, a new physical register identifier from the free list is used. To reduce the latency of move operations, the destination operand may be renamed with the physical register identifier used for the source operand of the move instruction when qualifying conditions are satisfied. Thus, the physical register identifier has duplicate mappings as the latency of the corresponding move operation is reduced.

An array separate from the free list may be used for maintaining duplicate mappings for physical registers. The array may be accessed with a physical register identifier, such as a physical register identifier for a particular source operand of a qualifying move operation. To provide a quick lookup during a renaming pipeline stage, the array may be a content addressable memory (CAM). Each entry in the CAM may include an identifier of a particular physical register and a count of the number of duplicates associated with the particular physical register identifier. However, the circuitry for a CAM consumes an appreciable amount of power.

The power consumption and latency of the capacitive word lines and corresponding word line buffers or drivers limit both the number of entries in the CAM and the size of each entry. Therefore, each of the number of physical register identifiers permitted to be duplicated at a given time and a maximum count for a given physical register identifier is limited. When these limits are reached, the latency of subsequent move operations are no longer reduced and performance decreases.

In view of the above, efficient methods and mechanisms for efficiently reducing the latency of data move operations are desired.

SUMMARY OF EMBODIMENTS

Systems and methods for efficiently reducing the latency of data move operations. In one embodiment, a processor includes a register rename unit configured to receive decoded instructions and determine whether a decoded given instruction qualifies to be a zero cycle move operation. Examples of qualifiers may be the move operation is a register-to-register move operation and support exists for maintaining a duplicate count of mappings for a given physical register number. If the determination is true, the rename register unit may assign a physical register number associated with a source operand of the given instruction to the destination operand of the given instruction. Each architectural register associated with the source operand and the destination operand may now be mapped to a same physical register number. In addition, control logic within the register rename unit may mark the given move instruction to prevent it from proceeding in the processor pipeline. For example, the control logic may mark the given move instruction to indicate completion at the dispatch pipeline stage.

In addition, the register rename unit may cause the value of the physical register number used for both the source and the destination operands to be bypassed to one or more instructions that are both younger in-program-order than the given move instruction and have a data dependency on the given move instruction. Further maintenance of the particular physical register number may be done by the register rename unit during commit of the given move instruction. In various embodiments, a count of the number of mappings for a given physical register number is maintained within an associated entry of the free list.

These and other embodiments will be further appreciated upon reference to the following description and drawings.

Figure 1:
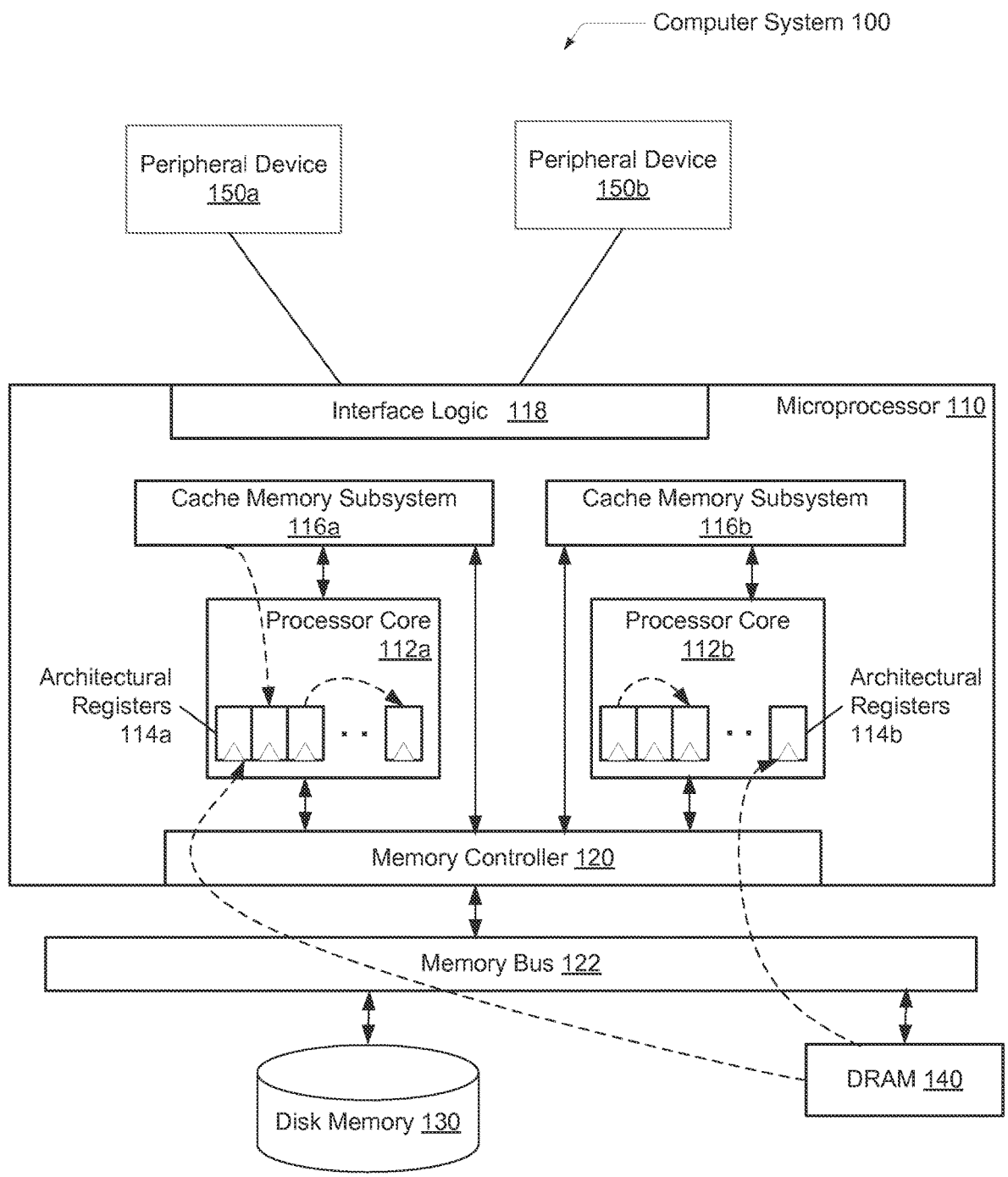
FIG. 1 is a generalized block diagram of one embodiment of a computer system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram of one embodiment of a computer system 100 is shown. As shown, microprocessor 110 may be connected to one or more peripheral devices 150a-150b, and external computer memory, such as disk memory 130 and dynamic random access memory (DRAM) 140. The disk memory 130 may store an operating system (OS) for the computer system 100. Instructions of a software application may be loaded into one or more of the cache memory subsystems 116a-116b within the microprocessor 110. The software application may have been stored in one or more of the disk memory 130, the DRAM 140 and one of the peripheral devices 150a-150b.

One or more of the processor cores 112a-112b may load the software application instructions from one of an associated cache memory subsystems 116a-116b and process the instructions. Generally speaking, when software programmers write applications to perform work according to an algorithm or a method, the programmers utilize variables to reference temporary and result data. This data utilizes space allocated in computer memory. The operating system allocates regions of memory for the software application.

During processing of the application, the data may be loaded from the allocated regions of memory into one or more of the cache memory subsystems 116a-116b. Subsequently, one or more of the architectural registers 114a-114b within the processor cores 112a-112b are used to load and store the temporary and result data. The architectural registers 114a-114b are architecturally visible registers that a software programmer and/or a compiler may identify within the software application. The architectural registers 114a-114b are associated with a given instruction set architecture (ISA). The hardware in the processor cores 112a-112b includes circuitry for processing instructions according to the given ISA. The hardware circuitry includes at least an associated set of architectural registers 114a-114b, functional units, pipeline staging elements and control logic.

The given ISA may be used to select a manner for declaring and allocating regions of memory. The given ISA may further determine a selected addressing mode used to transfer data between the microprocessor 110, including the architectural registers 114a-114b, and memory locations in one or more of the disk memory 130, the DRAM 140 and the peripheral devices 150a-150b. A load instruction is typically used to transfer data between memory and the microprocessor 110. A move instruction is used to transfer data between the architectural registers 114a within the processor core 112a. Similarly, a move instruction is used to transfer data between the architectural registers 114b within the processor core 112b. The dashed lines shown in the computer system 100 indicate a few examples of the data transfers performed by move and load operations.

In addition to including processor cores 112a-112b connected to corresponding cache memory subsystems 116a-116b, the microprocessor 110 may also include interface logic 118, and a memory controller 120. Other logic and inter- and intra-block communication is not shown for ease of illustration. The illustrated functionality of the microprocessor 110 may be incorporated upon a single integrated circuit. In another embodiment, the illustrated functionality is incorporated in a chipset on a computer motherboard. In some embodiments, the microprocessor 110 may be included in a desktop or a server. In yet another embodiment, the illustrated functionality is incorporated in a semiconductor die on a system-on-a-chip (SOC).

Each of the processor cores 112a-112b may include circuitry for executing instructions according to a given ISA as described earlier. In one embodiment, each of the processor cores 112a-112b may include a superscalar, multi-threaded microarchitecture used for processing instructions of a given ISA. Although multiple general-purpose processor cores are shown in the microprocessor 110, in various other embodiments, the microprocessor 110 may include one or more other specific cores, such as a digital signal processor (DSP), a graphics processing unit (GPU), an application specific integrated circuit (ASIC), and so forth.

Each of the cache memory subsystems 116a-116b may reduce memory latencies for a respective one of the processor cores 112a-112b. In addition, one or more shared cache memory subsystems may be used. A reduced miss rate achieved by the additional memory provided by the cache memory subsystems 116a-116b helps hide the latency gap between a given one of the processor cores 112a-112b and the off-chip memory.

If a cache miss occurs, such as a requested block is not found in a respective one of the cache memory subsystems 116a-116b, then a read request may be generated and transmitted to the memory controller 120. The memory controller 120 may translate an address corresponding to the requested block and send a read request to the off-chip DRAM 140 through the memory bus 122. The memory controller 120 may include control circuitry for interfacing to the memory channels and following a corresponding protocol. Additionally, the memory controller 120 may include request queues for queuing memory requests. The off-chip DRAM 140 may be filled with data from the off-chip disk memory 130.

The off-chip disk memory 130 may provide a non-volatile, random access secondary storage of data. In one embodiment, the off-chip disk memory 130 may include one or more hard disk drives (HDDs). In another embodiment, the off-chip disk memory 130 utilizes a Solid-State Disk (SSD).

The off-chip DRAM 140 may be a type of dynamic random-access memory that stores each bit of data in a separate capacitor within an integrated circuit. Unlike HDDs and flash memory, the DRAM 140 may be volatile memory, rather than non-volatile memory. The off-chip DRAM 140 may include a multi-channel memory architecture. This type of architecture may increase the transfer speed of data to the memory controller 120 by adding more channels of communication between them.

Although only two peripheral devices are shown in the computer system 100 for illustrative purposes, another number of peripheral devices may be connected to the microprocessor 110. One or more of the peripheral devices 150a-150b may be a display including a modern TV or a computer monitor. The computer monitor may include a thin film transistor liquid crystal display (TFT-LCD) panel. Additionally, the display may include a monitor for a laptop and other mobile devices. A video graphics subsystem may be used between the display and the microprocessor 110. The video graphics subsystem may be a separate card on a motherboard and include a graphics processing unit (GPU). One or more of the peripheral devices 150a-150b may be one of a typically utilized input/output device such as a keyboard, mouse, printer, modem, and so forth.

As described earlier, the dashed lines shown in the computer system 100 indicate a few examples of the data transfers performed by move and load operations. A given ISA may have a number of different move instructions. Depending on whether the software application is in a 16-bit or 32-bit code segment and whether an override instruction prefix is used, a move operation may transfer 8-bits, 16-bits, 32-bits or 64-bits of data. A significant percentage of the assembly language instructions used to implement the software programmer's application may include these move operations.

The mnemonic mov for the move instruction is a slight misnomer. Generally, the move instruction does copy data from one location to another. For example, the move instruction creates a copy of the data content in a first location specified by a source operand and writes this data content to a second location specified by a destination operand. However, the first location specified by the source operand does not become empty or invalid. The data content originally stored in the second location specified by the destination operand is generally overwritten during the execution of the move instruction. However, as described later, the data content originally stored in the second location specified by the destination operand may not be overwritten when the move instruction is converted to a zero cycle move operation. Rather, the destination operand may be assigned a renamed register number (or any other suitable identifier) that is also used by the source operand. Further details are provided later.

The move operation may occur frequently during the execution of software applications, such as being used in subroutines. A subroutine may also be referred to as a procedure or as a function. Subroutines reduce the cost of developing large, reliable programs. Subroutines are often collected into libraries and used for sharing software. At the beginning of subroutines, a base pointer is assigned a value stored in a stack pointer. A move operation is used for this assignment. At the end of subroutines, the stack pointer is assigned a value stored in the base pointer. Again, a move operation is used for this assignment.

Generally speaking, when a software application is compiled for execution on the microprocessor 110, the application may comprise multiple processes. Each process may own its own resources such as an image of memory, or an instance of instructions and data before application execution. Additionally, each process may include process-specific information such as an address space that addresses the code, data, and possibly a heap and a stack. The address space may be a contiguous virtual address space, wherein a mapping between virtual addresses and physical addresses determines the location of values in physical memory, such as disk memory and DRAM.

In various embodiments, static data, a stack, and a heap determine data allocation for a software application. Static data may be used to allocate global variables and constants. The stack may be used to allocate scalar variables rather than arrays as used in the static data. The stack may include local variables and parameters in the functions currently being invoked. The stack may be grown and shrunk on a subroutine call or return, respectively. When a subroutine is called, its associated stack frame is pushed onto the stack. When a subroutine terminates, it removes its associated data from the stack.

In various embodiments, the stack pointer stores an address value that points to a last element used on the stack, rather than the first free element. The stack pointer may be implicitly adjusted with instructions, such as at least the instruction types push, pop, call and ret. The stack pointer may be one of a number of general-purpose architectural registers defined by a given ISA. For example, an exemplary ISA includes a 32-bit integer register named r13 that is architecturally visible to the multiple instruction sets. The register r13 has the role of a stack pointer in a procedure call. In another example, another ISA includes a 32-bit general-purpose register named ESX, which is used as a stack pointer. Other registers may be used as a stack pointer for a stack in other ISAs.

In various embodiments, the base pointer register may be used to reference subroutine parameters and local variables in the current active stack frame within the stack. The base pointer is typically explicitly adjusted. One exemplary ISA includes a 32-bit integer register named r14 that is architecturally visible to multiple instruction sets. The register r14 has the role of a link pointer in a procedure call. The link pointer may also be referred to as a base pointer or a frame pointer. In another example, another ISA includes a 32-bit general-purpose register named EBX, which is used as a base pointer. Other registers may be used as a base pointer for a stack in other ISAs.

Within the subroutine body, parameters and local variables may be located at constant offsets from the base pointer for the duration of the subroutine execution. The subroutine caller's register values are recovered from the stack, the local variables are deallocated by resetting the stack pointer, the subroutine caller's base pointer value is recovered, and the return instruction, ret, is used to return to the appropriate code location in the caller. At least each of the beginning and the end of the subroutine utilizes a register-to-register move operation. A simplified example of the use of a move operation within a subroutine is provided in the following code:

| SubExample: | // Start of subroutine |
| | // Prologue |
| push bp | // Save the old base pointer |
| mov bp, sp | // Set the new base pointer |
| sub sp, n | // Reserve n bytes of local storage |
| push reg1 | // Save register values that the subroutine |
| push reg2 | // will modify |
| | // Body |
| | // do some processing |
| | // Epilogue |
| pop reg2 | // Recover register values |
| pop reg1 | |
| add sp, n | // Remove saved n bytes of storage |
| mov sp, bp | // Deallocate local variables |
| pop bp | // Restore the caller's base pointer |
| ret | |

In the above example, the destination operand is listed first followed by the source operand. However, the opposite convention is possible and contemplated. As seen above, the subroutine utilizes at least two register-to-register move operations. The register-to-register move operations shown above affect the base pointer denoted by "bp" and the stack pointer denoted by "sp". In addition, the body of the subroutine may use register-to-register move operations. Machine code statistics may show a significant portion of code utilizes move operations, 2 operands, and register operand types.

In addition, register-to-register move operations may transfer data between general-purpose registers and specific-purpose registers. For example, three-dimensional graphics programs may use a single-instruction-multiple-data (SIMD) microarchitecture. The associated SIMD registers may be included in a general-purpose processor that supports multimedia extensions to its ISA. Alternatively, the SIMD registers may be included in a graphics processing unit (GPU). As described earlier, the microprocessor 110 may include specific-purpose processor cores in addition to general-purpose processor cores.

A different mnemonic other than "mov" may be used to distinguish between a general-purpose register-to-register move operation, a general-purpose to specific-purpose register-to-register move operation, and a specific-purpose register-to-register move operation. The above-simplified examples illustrate some uses of the move operation and the potential for its high occurrence in assembly language code. In addition, these move operations typically include the read-after-write (RAW) data dependency, which cause serialization of instruction execution for associated source code segments, reducing throughput.

In addition to out-of-order issue of instructions to execution units within a superscalar microarchitecture, each of the processor cores 112a-112b may perform register renaming to increase throughput. Each of the processor cores 112a-112b may include a set of physical registers larger than a set of integer and floating-point architecturally visible registers, such as sets 114a and 114b. For example, in some embodiments, each of the processor cores 112a-112b includes 32 architecturally visible architectural registers and 192 physical registers.

Using hardware, each of the processor cores 112a-112b dynamically renames an architectural register identifier used for a source operand. Similarly, the hardware dynamically renames an architectural register identifier used for a destination operand. The renaming may occur after instruction decode. When a source operand is renamed, a previously used physical register number may be mapped to the source operand if that mapping is still valid. Otherwise, a new physical register number from a free list may be mapped to the source operand. When a destination operand is renamed, a new physical register number from the free list is used. When an instruction commits, a physical register storing the instruction destination value becomes a candidate to return to the free list.

When the hardware renames an architectural register identifier with a physical register identifier, the hardware stores the mapping in a data structure, such as a mapping table. As used herein, an identifier for either an architectural register or a physical register may also be referred to as a number. Therefore, an architectural register identifier may also be referred to as an architectural register number. Similarly, a physical register identifier may be referred to as a physical register number. The physical register number used to rename an architectural register number may also be referred to as a rename register number.

In one embodiment, each of the processor cores 112a-112b includes control logic that determines a given move instruction includes architectural register identifiers both for a source operand and a destination operand. The given move instruction includes architectural register identifiers for the operands rather than an immediate value or an address for a memory location. In response to this determination, the control logic may assign a given rename register number associated with the source operand of the given move instruction to the destination operand of the given move instruction. Each of the source operand and the destination operand are now mapped to a same rename register number. In addition, the control logic may mark the given move instruction to prevent it from proceeding in the pipeline of the processor core. For example, the control logic may mark the given move instruction to indicate completion at the dispatch pipeline stage.

Continuing with implementing the given move instruction as a zero cycle operation, the value of the rename register number used for both the source and the destination operands may also be bypassed to one or more instructions younger in program order than the given move instruction. These one or more younger instructions may be in a same rename group as the given move instruction and may be dependent on the given move instruction. The actions of assigning a same rename register number to both the source and the destination operand of the given move instruction and bypassing this rename register number to younger, dependent instructions creates duplicate mappings in the mapping table. This rename register number represents two or more architectural registers.

The control logic may store the multiple mappings for the rename register number. Additionally, the control logic may store a duplicate count for the rename register number. This duplicate count may include the number of times any given architectural register number has been mapped to the rename register number. In various embodiments, the duplicate count may not be incremented for a mapping when a particular architectural register is already mapped to the rename register number at the time of the mapping. Further details and examples of this occurrence are provided later.

Each of the processor cores 112a-112b may include a free list data structure for storing both the rename register number and the associated duplicate count. In various embodiments, the free list has a number of entries equal to the number of physical register numbers. For example, each of the processor cores 112a-112b may utilize 192 physical register numbers. Therefore, the free list in this embodiment would have 192 entries.

In some embodiments, the free list may be implemented with flip-flop registers, wherein each entry corresponds to a respective rename register number and stores a respective duplicate count. Each entry in the free list may have any size for the associated duplicate count. The size of the duplicate count may be determined with simulations of typical applications. For example, an effective size of the duplicate count may be 3 bits for a maximum duplicate count of 7. Accordingly, each entry utilizes 3 flip-flop registers. However, other sizes of the duplicate count may be possible and chosen. A zero count in an entry of the free list corresponding to a respective rename register number indicates the respective rename register is free. A non-zero count corresponding to the respective register number indicates the respective rename register is not free, with the non-zero count indicating the number of mappings for the rename register number.

As described earlier, a common RAW dependency with an architectural register is assigning a base pointer a value stored in a stack pointer at the beginning of subroutines. A related second example is assigning the stack pointer a value stored in the base pointer to deallocate variables at the end of subroutines. These assignments are performed with move operations. Designated registers may be used for the stack pointer and the base pointer based on the ISA. Regardless of the designated registers to use as the stack pointer and the base pointer, the register-to-register move operations used both within and outside the procedure call may be converted to zero cycle move operations. This conversion reduces both instruction latency and power consumption.

As briefly described earlier, control logic may convert a register-to-register move operation to a zero cycle move operation by assigning a given rename register number associated with the source operand of the move instruction to the destination operand of the move instruction. Each of the source operand and the destination operand are now mapped to a same rename register number. In addition, the control logic may mark the move instruction to prevent it from proceeding in the pipeline of the processor core. For example, the control logic may mark the given move instruction to indicate completion at the dispatch pipeline stage. Further, the value of the rename register number used for both the source and the destination operands may be bypassed to one or more instructions younger in program order than the move instruction. In the remainder of the description below, examples are given of register renaming and register renaming when creating a zero cycle move operation. Implementations of control logic in the pipeline stages are shown followed by examples of retiring instructions when created zero cycle move operations are present.

Figure 2:
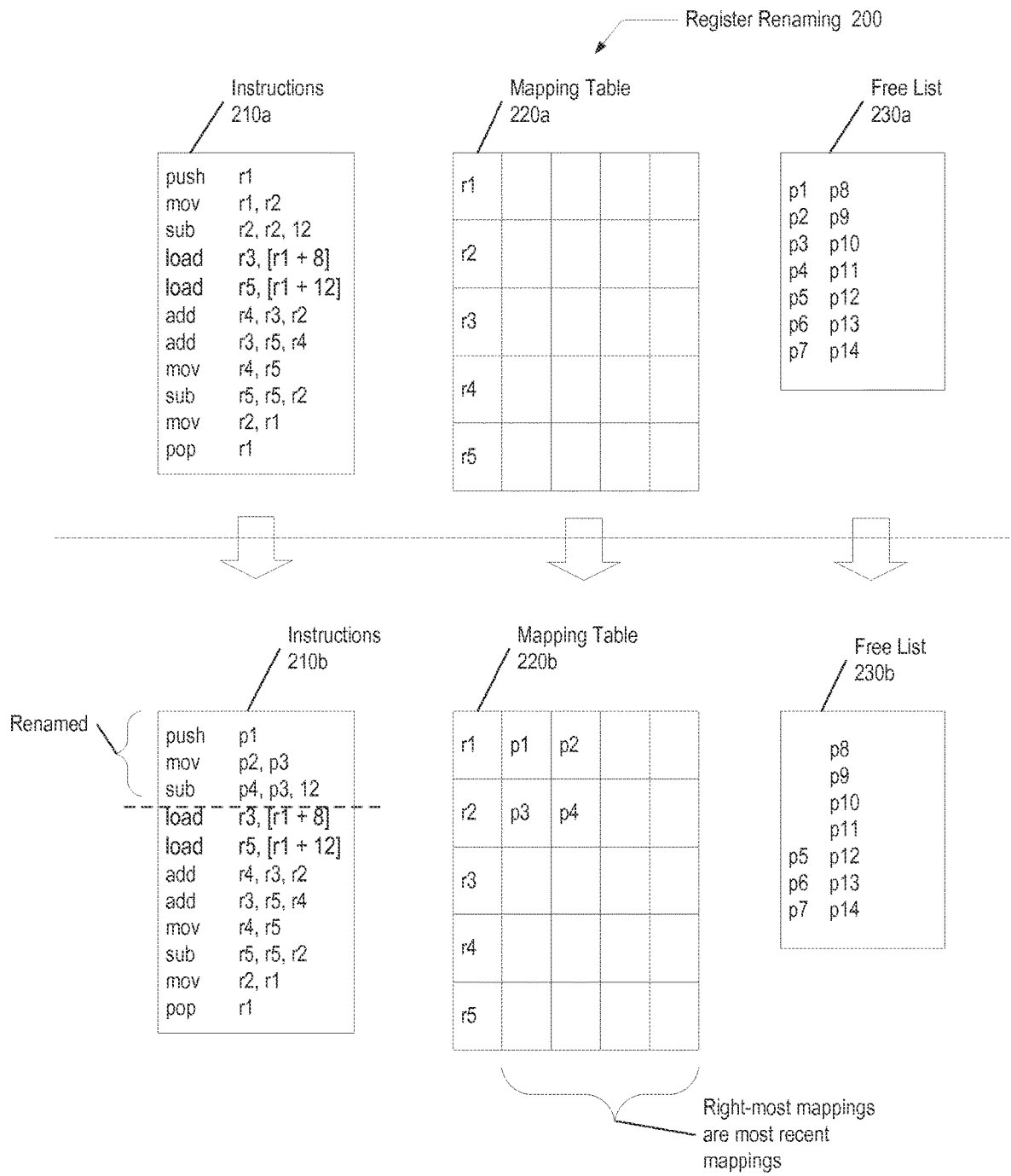
FIG. 2 is a generalized block diagram of one embodiment of register renaming.

Turning now to FIG. 2, a generalized block diagram illustrating one embodiment of register renaming 200 is shown. FIG. 2 generally depicts instructions 210, mapping table 220, and free list 230 before (upper portion of figure) and after (lower portion of figure) a rename operation. A simplified example of a subroutine includes the instructions 210a. In this example, a destination operand is listed first after an instruction mnemonic followed by one or more source operands. Registers use the general nomenclature of "r" followed by a register identifier. For example, register 1 is denoted by "r1". Although data conversions may be performed and data transfers between general-purpose and specific-purpose registers may occur in addition to data transfers between a first specific-purpose register set and a second specific-purpose register set may occur, this example does not show these scenarios for ease of illustration. However, such data conversions and data transfers are possible and contemplated.

The instructions 210a are meant to be a pseudocode example and language agnostic. For example, the fourth and fifth instructions read contents of a memory into architectural registers r3 and r5. This type of operation may be performed with the general load instructions shown in the example. In a selected ISA a particular read request instruction may be used. For one exemplary ISA, a single register data transfer instruction may be used, such as "ldr r3, [r1, #8]". In other embodiments, a different ISA may be selected which uses different instruction syntax.

As shown, the instructions 210a utilize five registers labeled r1-r5. The mapping table 220a generally shows a data structure for storing mappings between architectural register numbers and physical register numbers. It is noted that while the discussion here uses register "numbers", other embodiments could use other types of identifiers to distinguish registers from one another. The free list 230a shows the physical register numbers available for renaming purposes. In this example, there are 14 physical register names using the general nomenclature of "p" followed by a register identifier. As such, free list 230a shows physical registers p1-p14 are available for register renaming.

Referring to the instructions 210b, these instructions are the same as the instructions 210a; however, register renaming has occurred for the first three instructions. While the example shows three instructions having had registers renamed, any number of instructions per pipeline stage may be chosen for simultaneous processing. The mapping table 220b stores the mappings for the renamed registers. Here, the register r1 is renamed to p1 for the push instruction. For the mov instruction, the destination operand, or register r1, is renamed to p2 and the source operand, or register r2, is renamed to p3. For the sub instruction, the destination operand, or register r2, is renamed to p4 and the source operand, or register r2, uses the previous rename value, which is p3.

Figure 3:
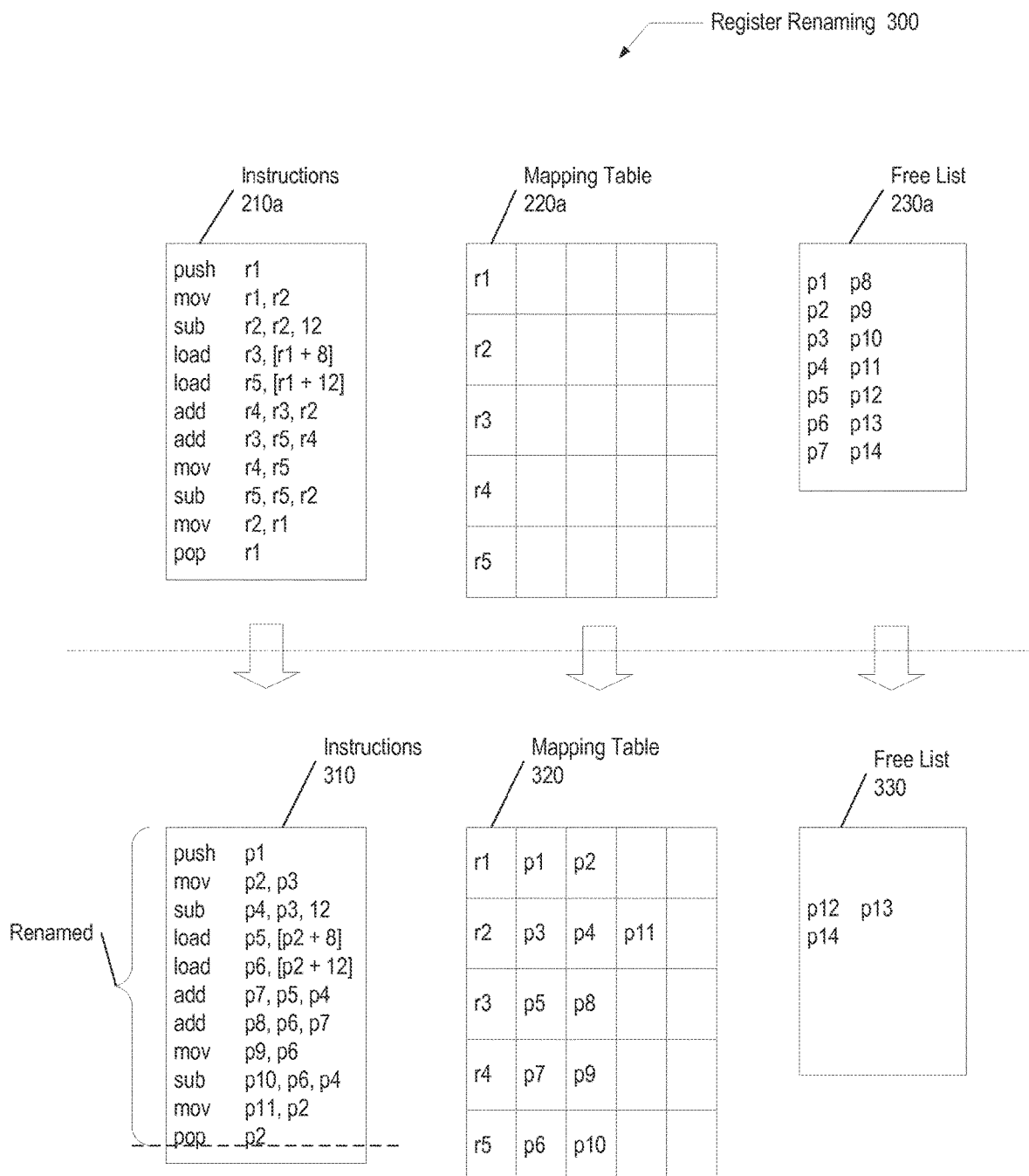
FIG. 3 is a generalized block diagram of another embodiment of register renaming.

Turning now to FIG. 3, a generalized block diagram illustrating another embodiment of register renaming 300 is shown. The example shown in the register renaming 300 is a continuation of the example shown in the register renaming 200. Referring to the instructions 310, these instructions are the same as the instructions 210a and 210b, however, register renaming has occurred for all of the instructions shown.

The mapping table 320 shows the stored mappings between architectural register numbers and physical register numbers. The free list 330 shows physical registers p12-p14 are still available after each of the renaming operation. The physical registers p1-p11 have been used to rename architectural registers r1-r5 in the instructions 310. In particular, register r1 has been renamed to p1 and p2 (e.g., noted as r1:p1, p2), r2:p3, p4, p11; r3:p5, p8; r4:p7, p9; and r5:p6, p10.

Figure 4:
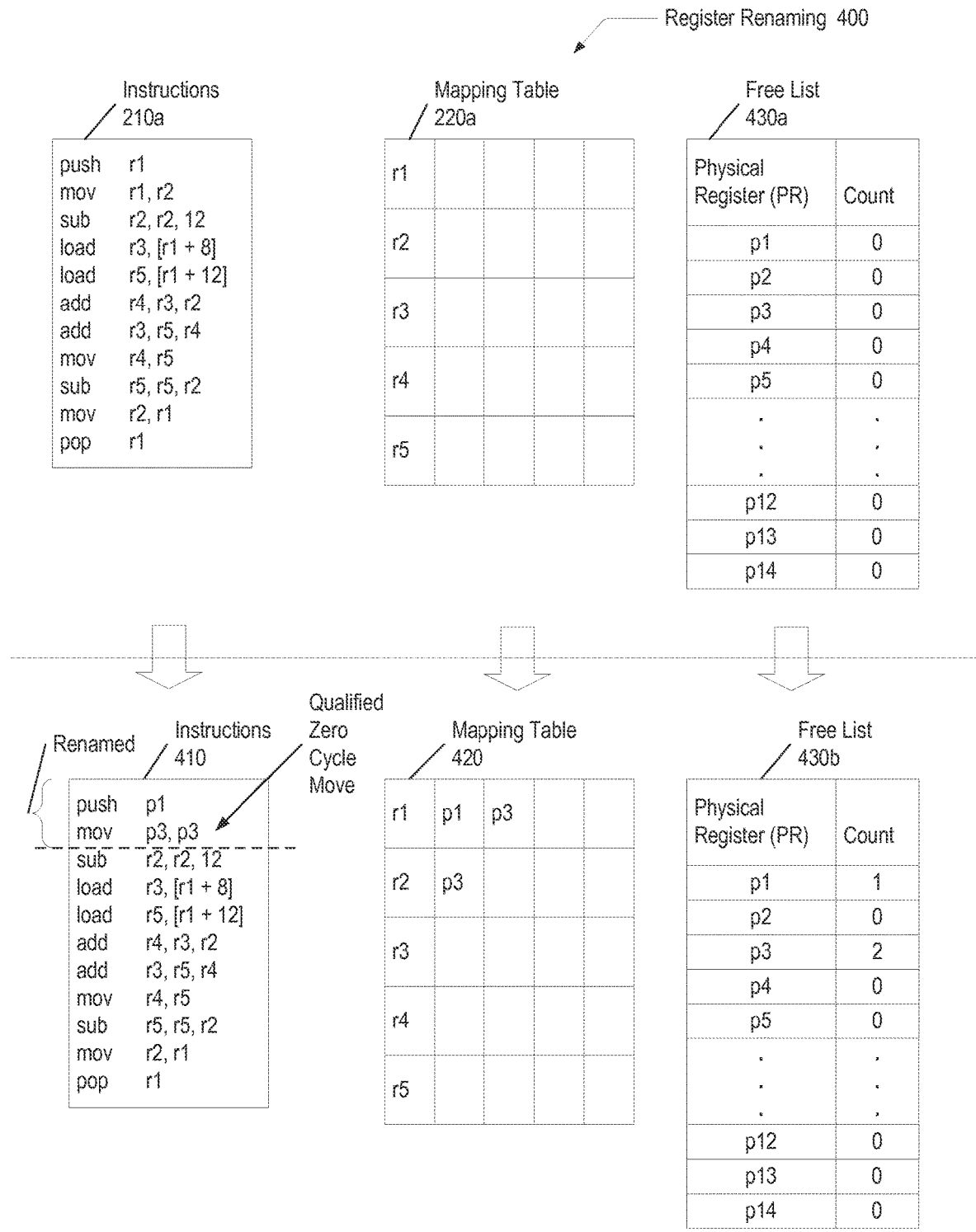
FIG. 4 is a generalized block diagram of one embodiment of register renaming with zero cycle move operations.

Turning now to FIG. 4, a generalized block diagram illustrating one embodiment of register renaming 400 with zero cycle move operations is shown. The example shown in the register renaming 400 utilizes the instructions 210a from the previous examples shown in FIG. 2 and FIG. 3. The mapping table 220a is also from the examples shown in FIG.

2 and FIG. 3. In this example, a zero cycle move operation is shown and the free lists 430a-430b are shown storing indications of duplicate mappings. The free list 430a shows the indications of duplicate mappings prior to register renaming. The free list 430a shows each of the rename registers p1-p14 have no mappings.

Referring to the instructions 410, renaming has occurred for the first two instructions. The mapping table 420 stores the mappings for the first two instructions. Here, the register r1 is renamed to p1 for the push instruction. The second instruction, the mov instruction, qualifies to be converted to a zero cycle move operation. In one embodiment, one qualifier is the move operation which is a register-to-register operation. Another qualifier is there exists support to store duplicate renaming mappings. For the mov instruction, the destination operand (r1) is renamed to a register rename number used for the source operand. The source operand, or register r2, is renamed to p3. Therefore, the destination operand, or register r1, is also renamed to p3. The free list 430b shows that the physical registers p1 and p3 are no longer available for mappings. However, as will be discussed more fully below, the physical register p3 may be reused despite not being free.

The mappings for the first two instructions are shown in the mapping table 420. As shown, the physical register number p3 is mapped twice—once for architectural register r2 and once for architectural register r1. This is a duplicate mapping. The free list 430b shows the indications of duplicate mappings once register renaming begins. The free list 430b shows the rename register p1 has a single mapping and the rename register p3 has 2 mappings. The free list 430b shows register rename mappings as qualified zero cycle move operations are processed within the instructions.

Figure 5:
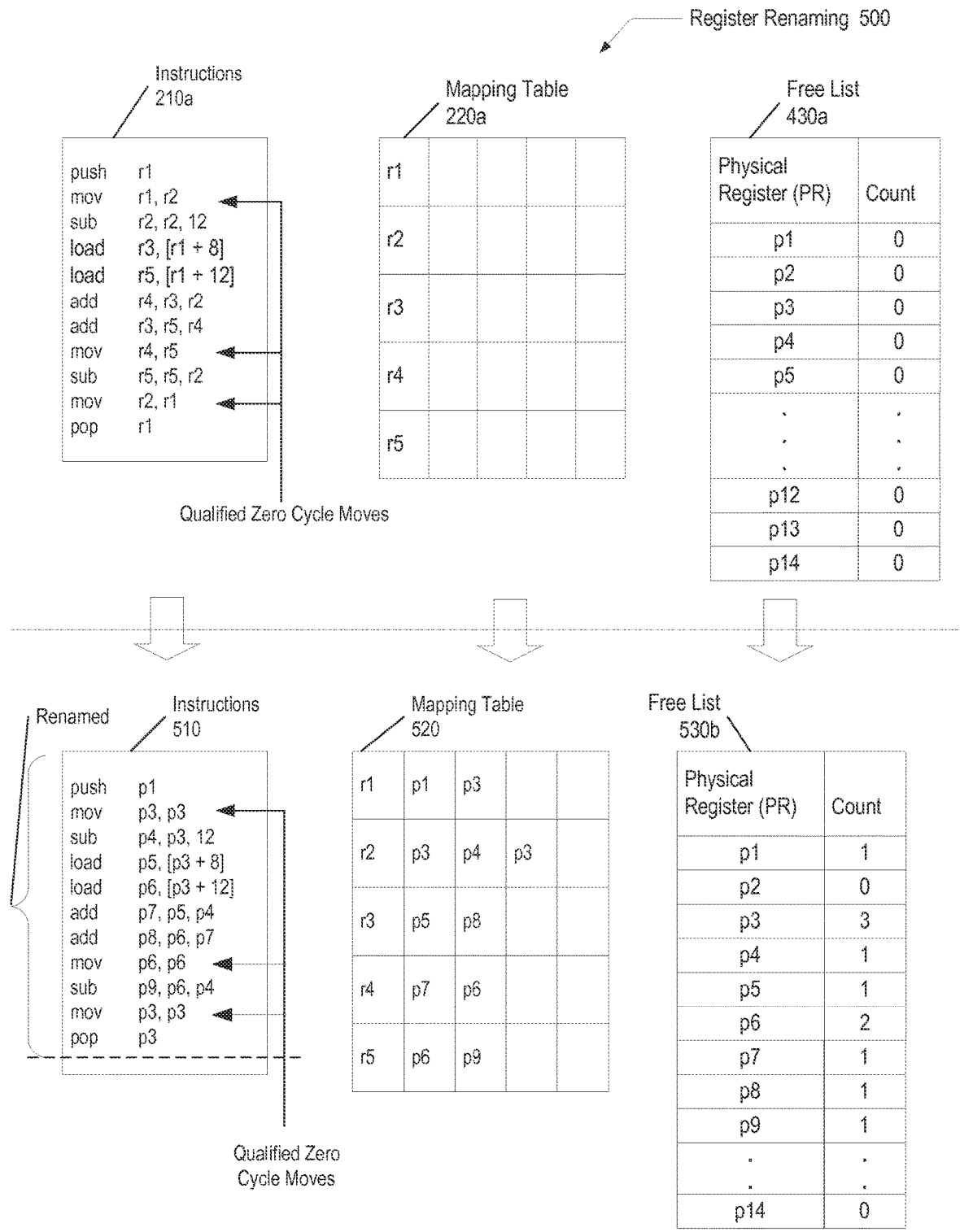
FIG. 5 is a generalized block diagram of another embodiment of register renaming with zero cycle move operations.

Turning now to FIG. 5, a generalized block diagram of continued register renaming 500 of the example with zero cycle move operations presented in FIG. 4 is shown. The example shown in the continued register renaming 500 utilizes the instructions 210a from the previous examples shown in FIG. 2 and FIG. 3. The mapping table 220a is also from the examples shown in FIG. 2 and FIG. 3. The free list 430a is from the previous example shown in FIG. 4. FIG. 5 shows mapping table 520 with the stored mappings between architectural register numbers and physical register numbers after renaming of all of the instructions in the example. The free list 530b shows physical registers p2 and p10-p14 are still available after each one of the instructions 510 have been renamed. Each of the entries for the physical registers p2 and p10-p14 has a count value of zero. The physical registers p1 and p3-p9 have been used to rename architectural registers r1-r5 in the instructions 510. Each of the entries for the physical registers p1 and p3-p9 has a non-zero count value.

Using the second mov instruction as an example, this instruction is a register-to-register operation that qualifies to be converted to a zero cycle move operation and the destination operand (r4) is renamed to the register name used for the source operand. As the source operand (r5) has been renamed to p6 (as will be discussed below), the destination operand (r4) is also renamed to p6. In this example, the register p6 was not in the free list 430a by the time registers for the second mov instruction were being renamed. The physical register p6 was previously mapped to r5 during processing of the second load instruction. However, at the time of processing the second mov instruction, the free list 530b is able to maintain duplicate mapping information for the physical register p6. In one embodiment, duplicate mapping information may include a physical register identifier and an associated duplicate mapping count stored in an allocated entry. In one embodiment, the duplication count for each of the physical registers may be represented by a particular number of bits (e.g., three bits). In such an embodiment, once the count reaches a maximum value (e.g., 7 for three bits), the duplication count may be deemed saturated and no further duplications are available for that register. In the example shown, p6 is not saturated and further duplication is possible.

In the example of FIG. 5, the third mov instruction also qualifies to be converted to a zero cycle move operation. For the third mov instruction, the destination operand, r2, is renamed to a register name used for the source operand. The source operand, r1, has already been renamed to p3. Therefore, the destination operand, r2, is also renamed to p3. Similar to the above, the physical register p3 was not in the free list 530b by the time the third mov instruction was being renamed. The physical register p3 was previously mapped to each of r1 and r2 during processing of the first mov instruction. However, at the time of processing the third mov instruction, the free list 530b is able to continue maintenance of duplicate mapping information for the physical register p3. When the third mov instruction is processed, an associated entry in the free list 530b stores the duplicate count for the physical registers p3, which is not saturated. Therefore, the duplicate count stored in the free list 530b for the physical register p3 is updated. For example, the duplicate count is incremented from 2 to 3.

Figure 6:
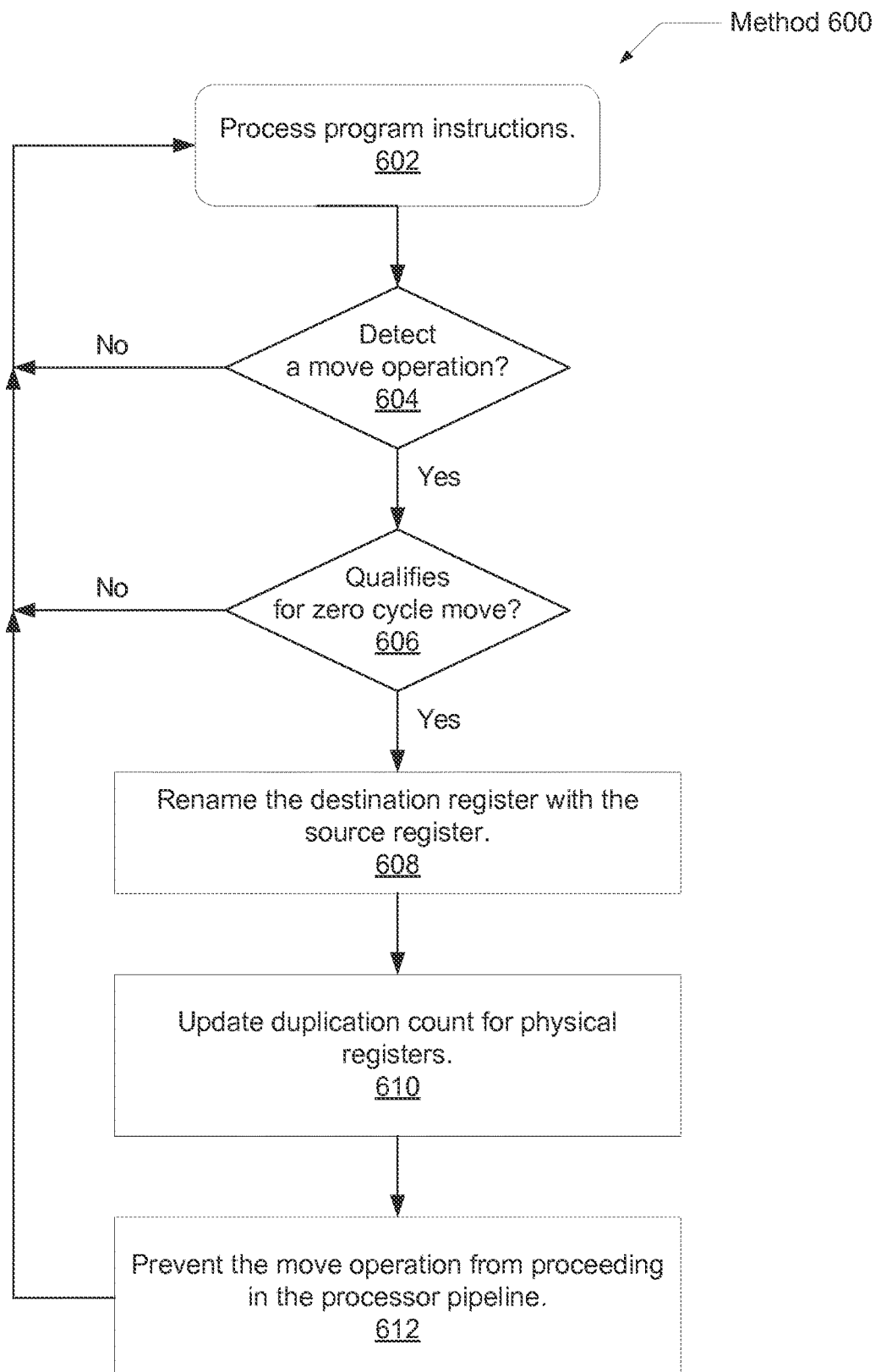
FIG. 6 is a generalized flow diagram illustrating one embodiment of a method for creating zero cycle move operations.

Referring now to FIG. 6, a generalized flow diagram of one embodiment of a method 600 for creating zero cycle move operations is shown. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 602, program instructions are processed. The instructions may be compiled, fetched from memory, decoded and executed. After decoding, if a given instruction is detected to be a move operation (conditional block 604), then a determination may be made as to whether the move operation qualifies to be a zero cycle move operation. One qualifier may be the move operation is a register-to-register move instruction.

Another qualifier for a zero cycle move operation may be whether the hardware currently is able to maintain duplicate mapping information for the move operation. For example, in one embodiment, a data structure, such as the free list, may be used. If the count within an entry in the free list corresponding to the already-assigned source physical register number is not already saturated, then the move operation may qualify to be converted to a zero cycle move operation. The count may be considered saturated when it reaches a maximum count value or threshold. Alternatively, if the source operand is not already assigned a physical register number, and there are available numbers with an entry storing a zero count, then the move operation may qualify to be converted to a zero cycle move operation.

If the move operation qualifies to be converted to a zero cycle move operation (conditional block 606), then in block 608 the destination operand is renamed with a same physical register identifier as the source operand. The mapping table may be updated with the renaming information. In block 610, the free list is updated with a duplication count for the physical register. The duplicate count may be incremented each time a given architectural register currently not mapped to the rename register is mapped to the rename register.

In block 612, the mov instruction may be marked (or an indication otherwise stored) in a manner to prevent it from being processed in the pipeline in an ordinary manner. Rather, in one example, the mov instruction is marked as complete at a dispatch pipeline stage. Therefore, the mov instruction consumes zero pipe stages and clock cycles for execution. In other examples, the mov instruction is marked as complete in another pipeline stage that is prior to an execution pipeline stage. As done with other renamed architectural registers, the physical register selected for renaming both the destination and the source operands may be bypassed to younger in-program-order instructions that have a data dependency on the mov instruction.

Figure 7:
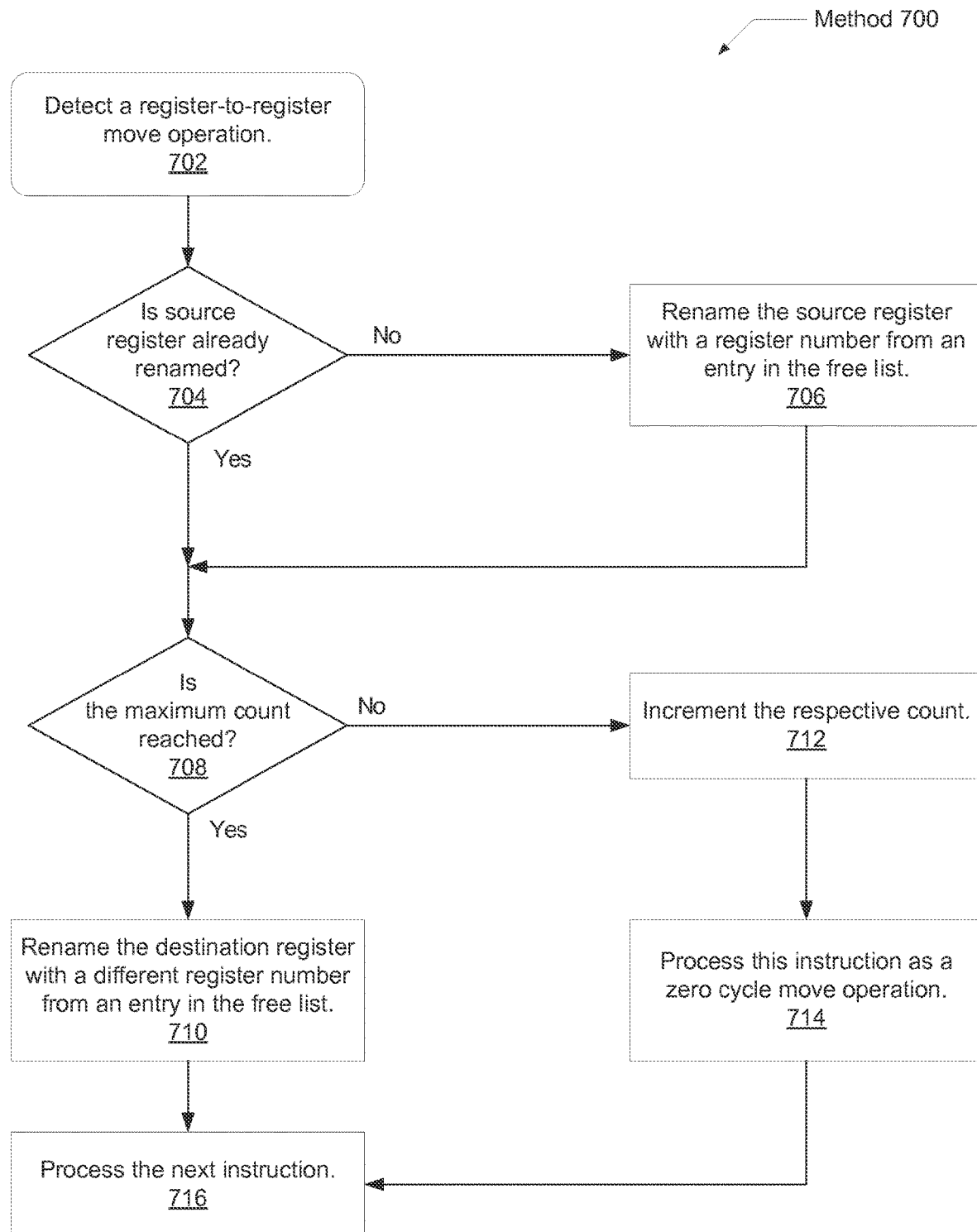
FIG. 7 is a generalized flow diagram illustrating another embodiment of a method for determining qualification for instruction conversion to zero cycle move operations.

Referring now to FIG. 7, a generalized flow diagram of one embodiment of a method 700 for determining qualification for instruction conversion to zero cycle move operations is shown. In block 702, a given instruction is detected to be a register-to-register move operation. A determination is then made as to whether the source register has already been renamed (conditional block 704). For example, an access of the mapping table may determine whether the source architectural register has already been renamed. If the source architectural register has not already been renamed (conditional block 704), then in block 706, the source architectural register is renamed with a physical register from the free list. An entry in the free list with an associated count field storing a value of zero may be allocated for the source physical register. It is noted that in various embodiments, all architectural registers are renamed. In which case, one or both of blocks 704 and 706 may be unnecessary. Various such embodiments are possible and are contemplated.

If in block 704 the source architectural register of the register-to-register move instruction is already renamed, then a determination may be made as to whether the corresponding renamed register number is able to be duplicated once more. For example, the physical register number may be used to index into the free list data structure. The count field in the respective entry of the free list may be read. A non-zero count in the associated entry in the free list that is greater than one may indicate the source physical register has been duplicated. A non-zero count in the associated entry in the free list that is also less than the maximum count may indicate the source physical register may be duplicated again. A zero count value in the associated entry may indicate the source physical register is being used for the first time, such as being allocated in block 706.

The count for the renamed source physical register may be compared to a given threshold. In one embodiment, the threshold may correspond to a maximum number of assignments for the physical register. For example, when the count field utilizes 3 bits, the maximum count value is 7. The physical register may be assigned 7 times with 6 of the assignments being duplications.

If an associated count has reached the threshold (conditional block 708), then in block 710, the destination architectural register is renamed with a physical register number from the free list. The selected physical register number may have a count field storing a value of zero. The renamed identifiers, an associated program counter (PC) value, dependency vectors, and so forth may be sent to a dispatch queue and later to a scheduler.

If the associated count has not reached the threshold (conditional block 708), then in block 712, the count value is incremented in the respective entry of the free list. In block 714, the move instruction is processed as a zero cycle move operation. For example, the steps in blocks 608-612 in the previous method 600 may be used. In block 716, a next available instruction may be processed. The next available instruction may be processed in parallel with the above steps or in a subsequent clock cycle.

Figure 8:
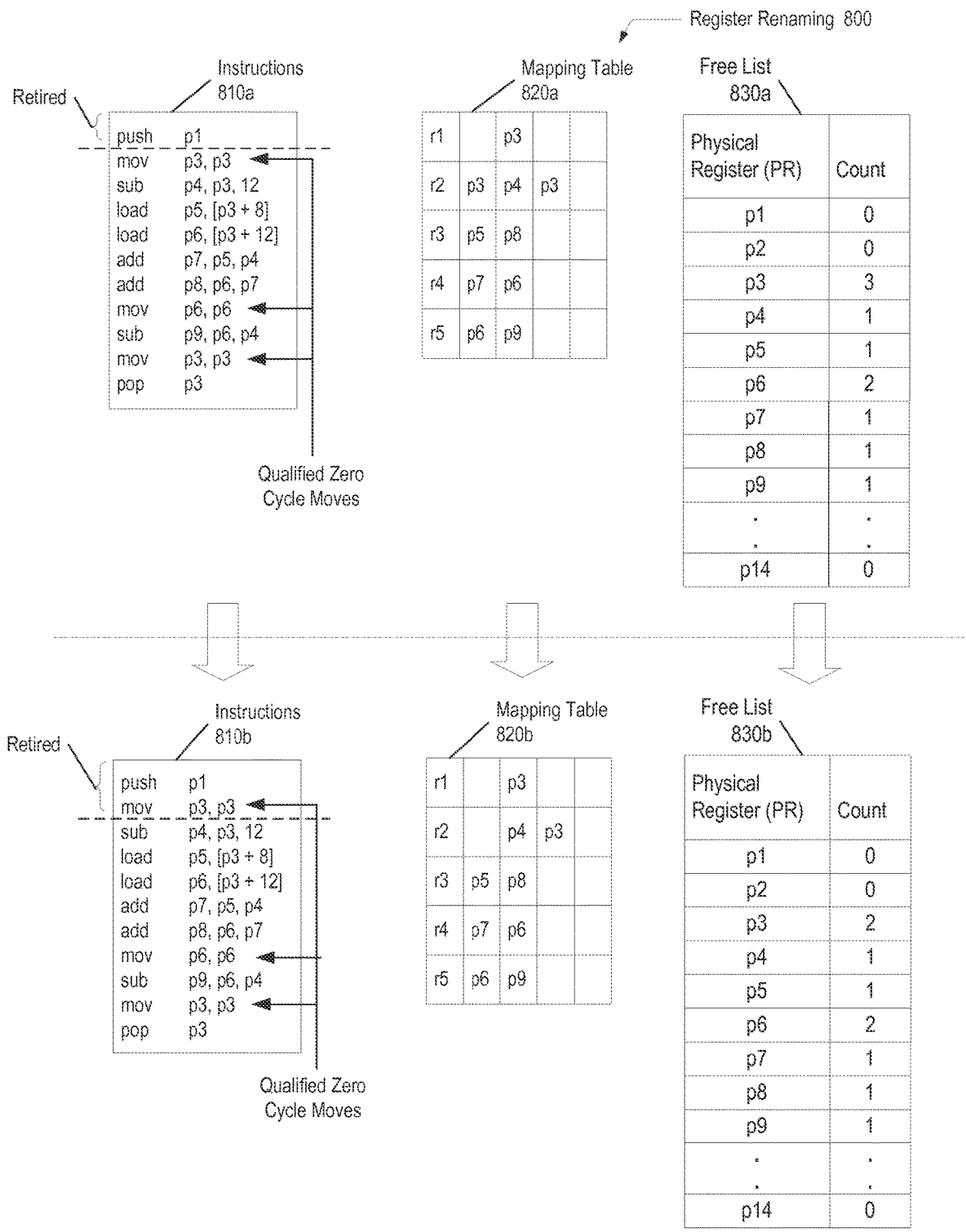
FIG. 8 is a generalized block diagram of one embodiment of register renaming during retirement of code with zero cycle move operations.

Turning now to FIG. 8, a generalized block diagram illustrating one embodiment of register renaming 800 during retirement of instructions with zero cycle move operations is shown. The example shown in FIG. 8 is a continuation of the example shown in FIG. 5. Here, renaming has completed and now instructions are being retired in-order. The instructions 810a are the same as instructions 510, which are the instructions 310a after each instruction has operands renamed.

The mapping table 820a and the free list 830a have the same values as the mapping table 520 and the free list 530b, respectively, except for updates corresponding to the first instruction being retired. The mapping table 820a shows the stored mappings between architectural register numbers and physical register numbers after the first instruction has been retired. The physical register p1 mapped to the architectural register r1 has been removed from the mapping table 820a and returned to the free list 830a.

Referring to the instructions 810b, the first two instructions, including the first zero cycle mov instruction, have been retired. Selecting a given number of instructions as retired is done for illustrative purposes and does not determine the retirement process by indicating a number of instructions being simultaneously retired in a given pipeline stage. Any number of instructions per pipeline stage may be chosen for simultaneous retirement and depends on a particular microarchitecture. In addition to the physical register p1 being removed from the mapping table 820b, the physical register p3 is removed from one entry in the mapping table 820b.

The oldest mapping between the physical register p3 and the architectural register r2 is removed from the mapping table 820b. The use of r2 as a renamed register p4 occurs in the next instruction, so the current mapping, which is the oldest mapping, to p3 is no longer utilized for r2. However, the younger mapping between the registers r2 and p3 remains. In addition, the mapping between the physical register p3 and the architectural register r1 remains. Therefore, the physical register p3 still has two mappings within the mapping table 820b, and thus, the physical register p3 is not returned to the free list 830b.

The free list 830b is updated with the current number of mappings for the physical register p3, which are 2 mappings. The count for the physical register p3 is decremented. Generally, a count is decremented each time an associated rename register number is ready to return to the free list for any given architectural register. A rename register number may be determined to be ready to return to the free list in response to a mapping being removed from the mapping table. Typically, a rename register number is returned to the free list in response to a mapping is removed from the mapping table. However, with duplicate mappings in the mapping table due to zero cycle move operations, the free list 830b may be inspected prior to any return to the free list 830b.

When a given rename register number is a candidate to return to being free (e.g., the count is one) within the free list 830b during an associated instruction commit, the rename register number is returned to being free within the free list 830b by having its count decremented from one to zero.

Figure 9:
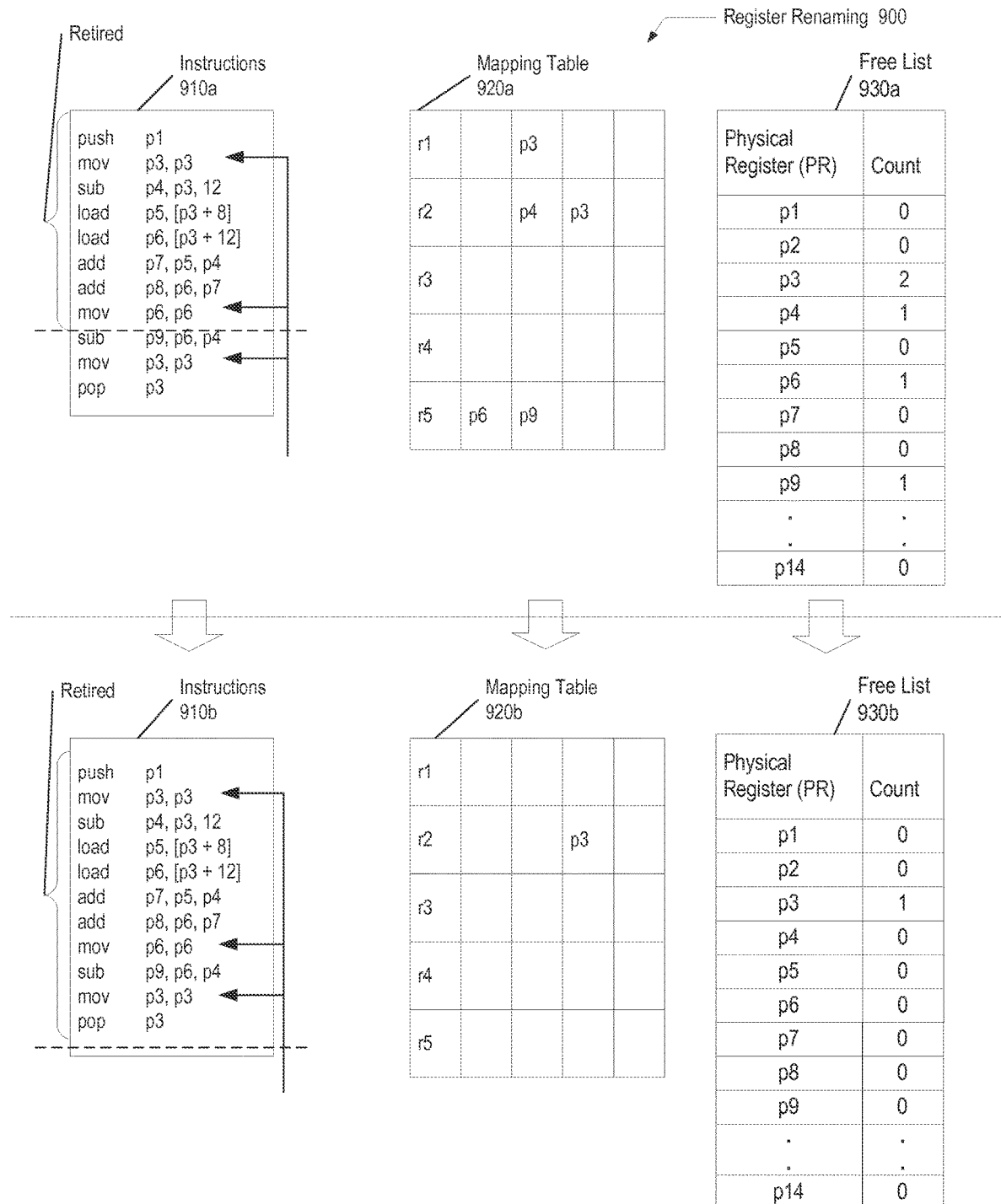
FIG. 9 is a generalized block diagram of another embodiment of register renaming during retirement of code with zero cycle move operations.

Referring now to FIG. 9, a generalized block diagram illustrating another embodiment of register renaming 900 during retirement of code with zero cycle move operations is shown. The example shown in the register renaming 900 is a continuation of the example shown in the register renaming 800. Referring to the instructions 910a, these instructions are the same as the instructions 810b, however, retirement has occurred for all but the last three instructions.

The mapping table 920a shows the stored mappings between architectural register numbers and physical register numbers after all but three instructions have retired. The free list 930a shows physical registers p1-p2; p5, p7-p8, and p10-p14 are available for mappings at this point. Each of the entries for these registers has a count value of zero. The physical registers p3, p4, p6 and p9 are still being used to rename architectural registers r1, r2 and r5 in the instructions 910a. Each of the entries for these registers has a non-zero count value.

The youngest mapping for the physical register p6, which occurred for the second mov instruction and for the architectural register r4, is removed from the mapping table 920a. The oldest mapping for the physical register p6, which occurred for the second load instruction and for the architectural register r5, remains in the mapping table 920a. Therefore, the physical register p6 still has one mapping within the mapping table 920a, and thus, the physical register p6 is not free within the free list 930a. The entry for the physical register p6 has a count value of 1. When a given rename register number is a candidate to being free (e.g., count is 1) within the free list 930a during an associated instruction commit, the count may be decremented to zero.

Referring to the instructions 910b, these instructions are the same as the instructions 910a, however, instruction commit has occurred for each of the instructions. In one embodiment, instruction commit and instruction retirement occur in a same pipeline stage. In other embodiments, results are committed in a first pipeline stage and the associated instruction is retired and removed from a retirement window in a later second pipeline stage. For purposes of returning physical register numbers to being free again (e.g., the count is decremented to zero) within a free list, the actions may take place when the instruction commits.

The mapping table 920b shows a mapping still exists between the physical register p3 and the architectural register r2. In one embodiment, this mapping may remain until the architectural register r2 is used again as a destination operand in subsequent code that is not shown. For example, other code or another subroutine may be called afterward and the value stored in the architectural register r2 may be used. In another embodiment, the mapping may be removed when a subsequent ret instruction (not shown) is committed. In yet another embodiment, the mapping may be removed when the pop instruction is committed. In such a case, the mapping table 920b would be empty. The free list 930b currently shows all physical register numbers except p3 are available for renaming. However, in the cases that the mapping between the physical register p3 and the architectural register r2 is removed, the free list 930b would show all physical register numbers p1-p14 are available for renaming.

When the last mov instruction is committed, the physical register p3 may not become a candidate for returning to the free list 930b. The architectural register r2, which is used as a destination operand for the last mov instruction, may be used in later code. The architectural register r1, which is used as a source operand for the last mov instruction, is used in the subsequent pop instruction. Therefore, for this case, the physical register p3 may not yet become a candidate for returning to the free list 930b.

When the last instruction, which is the pop instruction, is committed, the physical register p3 may become a candidate for being free again within the free list 930b. The mapping between the physical register p3 and the architectural register r1 may be removed from the mapping table 920b. The duplicate count may be decremented from two to one.

As described earlier, an associated count is decremented each time a rename register number is ready to return to being free again within the free list for any given architectural register. A rename register number may be determined to be ready to return to the free list in response to a mapping is removed from the mapping table. In the case of the last instruction, which is the pop instruction, the mapping between the physical register p3 and the architectural register r1 is removed from the mapping table 920b. Typically, a rename register number is returned to the free list in response to a mapping is removed from the mapping table.

In the example shown, the count for the physical register p3 is decremented from 2 to 1. Therefore, when a subsequent instruction commits that causes the mapping between the physical register p3 and the architectural register r2 to be removed from the mapping table 920b, the physical register p3 may be returned to being free within the free list 930b.

Figure 10:
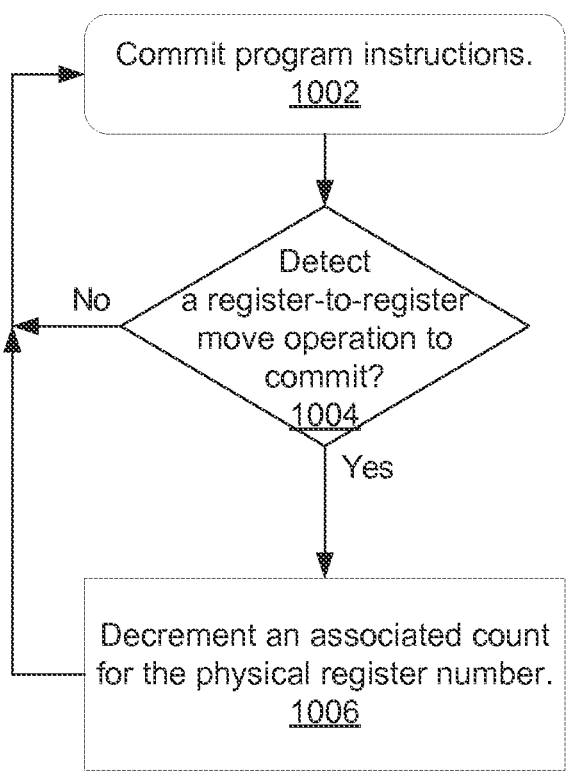
FIG. 10 is a generalized flow diagram illustrating one embodiment of a method for committing instructions that include zero cycle move operations.

Referring now to FIG. 10, a generalized flow diagram of one embodiment of a method 1000 for committing instructions that include zero cycle move operations is shown. In block 1002, program instructions are being committed. An in-order window of instructions within a data structure may be used to determine when to commit and retire instructions. For example, a reorder buffer (ROB) may be used as the data structure.

If an instruction to commit is detected to be a register-to-register move operation (conditional block 1004), then in block 1006, a count for the corresponding physical register number may be decremented. Generally, a count is decremented each time an associated physical register number is ready to return to being free within the free list for any given architectural register. A rename register number may be determined to be ready to return to being free within the free list in response to a mapping is removed from the mapping table. Typically, a rename register number is returned to being free within the free list in response to a mapping is removed from the mapping table. However, with duplicate mappings in the mapping table due to zero cycle move operations, an entry within the free list may still store a non-zero count for the rename register number. The rename register number is returned to being free within the free list when the associated count reaches zero when decremented.

In various embodiments, a check may be performed to determine whether both the destination physical register and the source physical register is duplicated, the destination physical register is not duplicated, but the source physical register is duplicated; or neither the destination physical register nor the source physical register is duplicated. In one example, an associated duplicate flag or field indicating a status of duplication for each of the destination and the source physical registers may be stored with other associated information for the instruction.

In another example of determining whether a physical register is duplicated at a commit pipe stage, a comparison and resulting match between the source physical register and the destination physical register may determine each of the destination and the source physical register is duplicated. In this case, the destination and the source physical register number is the same value. In yet another example, each of the destination and the source physical register may be used to index into a data structure such as the free list. The count values stored in the associated entries may indicate a corresponding physical register is already duplicated when the count is greater than one.

Figure 11:
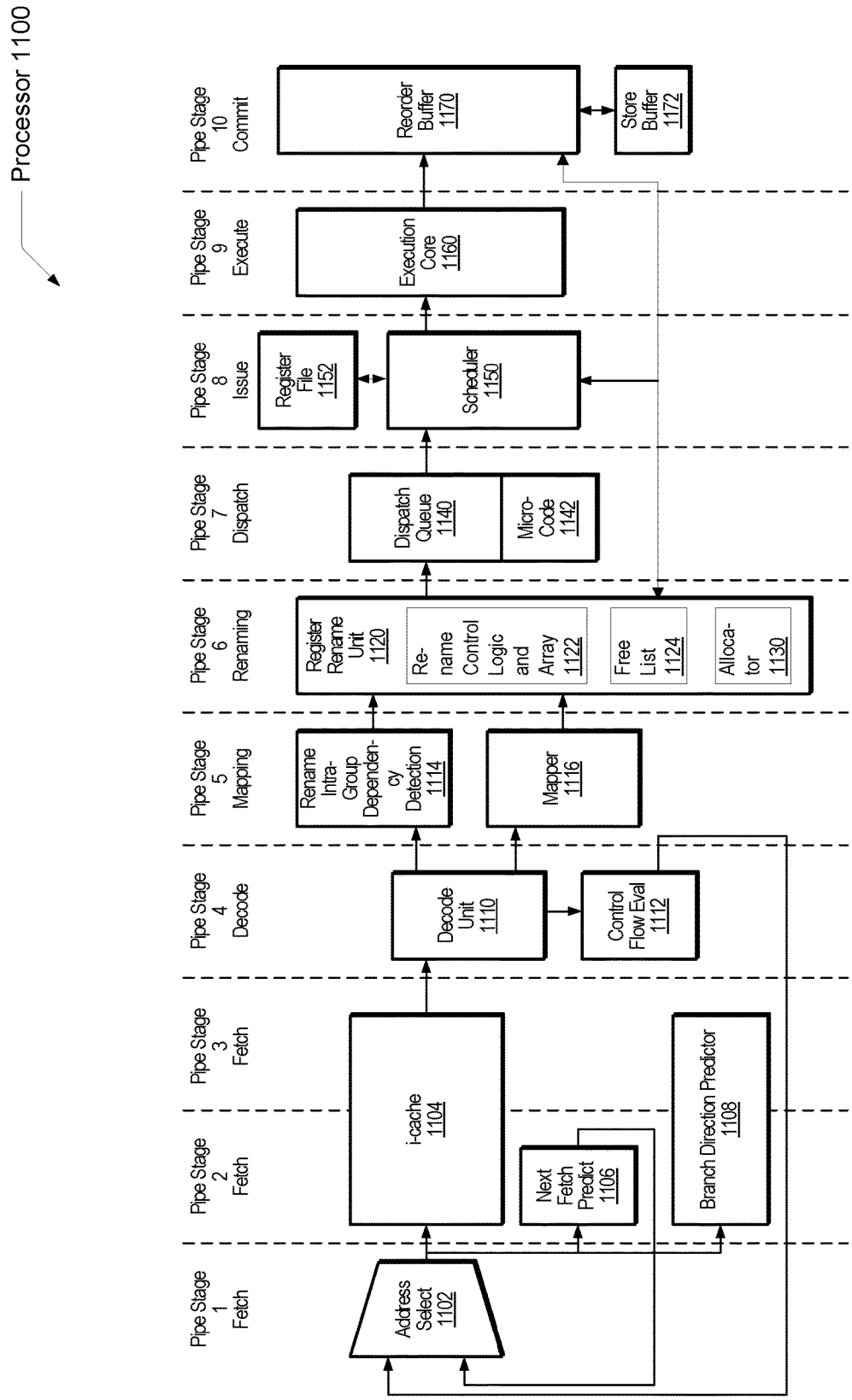
FIG. 11 is a generalized block diagram illustrating one embodiment of a processor core that performs superscalar, out-of-order execution with zero cycle move operations.

Referring now to FIG. 11, a generalized block diagram illustrating one embodiment of a processor core 1100 that performs superscalar, out-of-order execution with zero cycle move operations is shown. The processor core 1100 may utilize a multi-stage pipeline for processing of instructions. Although functional and control blocks are shown in a particular order and in a particular pipe stage, other combinations are possible and contemplated. In addition, the functional and control blocks may occupy more than one pipe stage. In most cases, a single pipe stage is shown for each functional block for ease of illustration.

An instruction-cache (i-cache) 1104 may store instructions for a software application. One or more instructions indicated by an address conveyed by address select logic 1102 may be fetched from the i-cache 1104. Multiple instructions may be fetched from the i-cache 1104 per clock cycle if there are no i-cache misses. The address may be incremented by a next fetch predictor 1106. A branch direction predictor 1108 may be coupled to each of the next fetch predictor 1106 and the control flow evaluation logic 1112 in a later pipeline stage. The predictor 1108 may predict information of instructions that change the flow of an instruction stream from executing a next sequential instruction.

The decode unit 1110 decodes the opcodes of the multiple fetched instructions. Alternatively, the instructions may be divided into micro-instructions, or micro-ops. As used herein, the terms "instructions" and "micro-ops" are interchangeable as the architecture in the processor may utilize either implementation. In one embodiment, the control flow evaluation block 1112 may alter fetch of instructions in the address selector 1102. For example, an absolute address value associated with an unconditional branch opcode may be sent to the address selector 1102.

Rename intra-group dependency detection logic 1114 may find dependencies among instructions decoded by the decode unit 1110. An intra-group of instructions may include decoded instructions from one or more clock cycles, or pipe stages. Dependencies such as write-after-read (WAR), write-after-write (WAW) and read-after-write (RAW) may be detected. Dependency vectors that indicate dependencies between instructions may be generated. The mapper 1116 may divide instructions among distributed hardware resources using factors such as available concurrency, criticality of dependence chains, and communication penalties.

The register rename unit 1120 may include rename control logic and array 1122 and the free list 1124 which may be stored in a memory. The register rename unit 1120 may determine which physical register numbers to use to rename architectural register numbers used in both destination and source operands within instructions. The register rename unit 1120 may select candidate physical register numbers from the free list 1124 using control logic in the allocator 1130. Alternatively, the register rename unit 1120 may select candidate physical register numbers from a rename mapping table within the rename control logic 1122. The register rename unit may determine a given move instruction qualifies to be converted to a zero cycle move operation as described earlier. The register rename unit 1120 may assign the destination operand a same rename register number as used for the source operand. Additionally, the register rename unit 1120 may mark the move instruction in a manner to prevent it from proceeding for instruction execution. For example, the register rename unit 1120 may mark the move instruction as complete at dispatch.

After instructions have been decoded and renamed, associated entries may be allocated in the dispatch queue 1140. Instructions and associated renamed identifiers, program counter (PC) values, dependency vectors, markings for completion, and so forth may be sent to the dispatch queue 1140 and later to the scheduler 1150. Various exceptions may be detected, such as by the execution core 1160. Examples include protection exceptions for memory accesses, no address translation, and so forth. The exceptions may cause a corresponding exception handling routine to be executed, such as by the microcode 1142.

The scheduler 1150 may schedule instructions for execution in the execution core 1160. When operands are available and hardware resources are also available, an instruction may be issued out-of-order from the scheduler 1150 to one of the functional units within the execution core 1160. The scheduler 1150 may read its source operands from an architectural register file 1152 after translating renamed identifiers with a mapping table or from operand bypass logic. The source operands may be provided to the execution core 1160.

The execution core 1160 may include a load/store unit. The load/store unit may be connected to a data cache (not shown) and the store buffer 1172 either directly or through the reorder buffer (rob) 1170. The processor 1100 may include a translation look-aside buffer (TLB) for each of the i-cache 1104 and the data cache to avoid a cost of performing a full memory translation when performing a cache access. The store buffer 1172 may store addresses corresponding to store instructions.

The rob 1170 may receive results from the execution core 1160. In addition, results may be bypassed to previous pipeline stages for data forwarding to dependent instructions already in the pipeline. The rob 1170 may ensure in-order commit and retirement of instructions. When a move instruction is a candidate for commit, the rob 1170 may send an indication to the register rename unit 1120. The register rename unit 1120 may determine whether an associated renamed register number is duplicated and whether the renamed register number is to be returned to the free list 1124. A duplicate count for duplicated renamed register numbers may be maintained within the rename register unit 1120. Incrementing and decrementing of the duplicate count may occur as described in earlier examples.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
   a free list comprising a plurality of entries with a number of the plurality of entries being less than or equal to a number of rename registers in the processor, including:
   one or more first entries for rename registers that are not currently assigned;
   one or more second entries for rename registers that are currently assigned and unduplicated; and
   one or more third entries for rename registers that are currently assigned and duplicated;
   wherein at least one of each of the first entries, the second entries, and the third entries:

is associated with a corresponding rename register identifier (ID); and
is configured to store a count of a number of mappings for the corresponding rename register ID;
a register file separate from the free list; and
a register rename unit configured to:
determine both a source operand and a destination operand of a given move instruction are registers;
identify a given rename register ID associated with the source operand; and
based at least in part on determining a count of a number of mappings in the free list for the given rename register ID being less than a maximum value:
assign the given rename register ID to the destination operand of the given move instruction; and
convey the given rename register ID from a reorder buffer to instructions younger in program order than the move instruction that have a data dependency on the move instruction.

2. The processor as recited in claim 1, wherein the register rename unit is further configured to, based at least in part on assigning the given rename register ID to the destination operand of the given move instruction, increment the count associated with the given rename register ID stored in a same entry of the plurality of entries allocated to the given rename register ID.

3. The processor as recited in claim 2, wherein the rename register unit is further configured to prevent the given move instruction from proceeding in a pipeline of the processor.

4. The processor as recited in claim 3, wherein to prevent the given move instruction from proceeding in the pipeline, the register rename unit is configured to indicate the given move instruction has been completed.

5. The processor as recited in claim 3, wherein in response to detecting the given move instruction is ready to commit, the register rename unit is further configured to decrement the count associated with the given rename register ID.

6. The processor as recited in claim 3, wherein to assign new register rename IDs to operands of instructions, the register rename unit is further configured to search the free list for an entry of the plurality of entries storing a zero count.

7. The processor as recited in claim 1, wherein the register rename unit is further configured to:
search a mapping table using a source operand ID associated with the source operand of the given move instruction; and
in response to finding the source operand ID in the mapping table, identify a respective count in the free list of the given rename register ID mapped to the source operand ID regardless of whether the given rename register ID is duplicated; and
in response to not finding the source operand ID in the mapping table, the register rename unit is further configured to identify an entry of the plurality of entries within the free list storing a zero count.

8. The processor as recited in claim 1, further comprising rename intra-group dependency detection logic configured to generate a dependency vector indicating dependencies between groups of instructions.

9. A method comprising:
maintaining a free list comprising a plurality of entries with a number of the plurality of entries being less than or equal to a number of rename registers in a processor, including:
one or more first entries for rename registers that are not currently assigned;
one or more second entries for rename registers that are currently assigned and unduplicated; and
one or more third entries for rename registers that are currently assigned and duplicated, wherein at least one of the first entries, at least one of the second entries and at least one of the third entries:
is associated with a corresponding rename register identifier (ID); and
is configured to store a count of a number of mappings for the corresponding rename register ID;
maintaining a register file separate from the free list;
determining both a source operand and a destination operand of a given move instruction are registers;
identifying a given rename register ID associated with the source operand; and
in response to determining a count of a number of mappings in the free list for the given rename register ID being less than a maximum value:
assigning the given rename register ID to the destination operand of the given move instruction; and
conveying the given rename register ID from a reorder buffer to instructions younger in program order than the move instruction that have a data dependency on the move instruction.

10. The method as recited in claim 9, further comprising incrementing the respective count for the given rename register ID stored in a same entry of the plurality of entries allocated to the rename register ID, responsive to assigning the given rename register ID to the destination operand of the given move instruction.

11. The method as recited in claim 10, wherein the method further comprises preventing the given instruction from proceeding in a pipeline of the processor.

12. The method as recited in claim 11, wherein to prevent the given move instruction from proceeding in the pipeline, the method further comprises indicating the given move instruction has been completed.

13. The method as recited in claim 11, further comprising decrementing the count associated with the given rename register ID, responsive to detecting the given move instruction is ready to commit.

14. The method as recited in claim 11, wherein to assign new register rename IDs to operands of instructions, the method further comprises searching the free list for an entry of the plurality of entries storing a zero count.

15. The method as recited in claim 11, further comprising:
searching a mapping table within the processor using a source operand ID of the source operand of the given move instruction; and
in response to finding the source operand ID in the mapping table, identifying a respective count in the free list of the given rename register ID mapped to the source operand ID regardless of whether the given rename register ID is duplicated.

16. The method as recited in claim 11, further comprising:
searching a mapping table within the processor using a source operand ID of the source operand of the given move instruction; and
in response to not finding the source operand ID in the mapping table, the method further comprises identifying an entry of the plurality of entries within the free list storing a zero count.

17. A register rename unit comprising:
a free list, separate from a register file, comprising a plurality of entries with a number of the plurality of entries being less than or equal to a number of rename registers in a processor, including:

one or more first entries for rename registers that are not currently assigned;
one or more second entries for rename registers that are currently assigned and unduplicated; and
one or more third entries for rename registers that are currently assigned and duplicated, wherein at least one of the first entries, at least one of the second entries and at least one of the third entries:
is associated with a corresponding rename register identifier (ID); and
is configured to store a count of a number of mappings for the corresponding rename register ID; and
control logic configured to:
determine both a source operand and a destination operand of an instruction are registers;
identify a given rename register ID associated with the source operand; and
based at least in part on a determination that a count of a number of mappings in the free list for the given rename register ID is less than a maximum value:
assign the given rename register ID to the destination operand of the given move instruction; and
convey the given rename register ID from a reorder buffer to instructions younger in program order than the move instruction that have a data dependency on the move instruction.

18. The register rename unit as recited in claim 17, wherein the control logic is further configured to, based at least in part on assigning the given rename register ID to the destination operand of the given move instruction, increment the respective count associated with the given rename register ID stored in a same entry of the plurality of entries allocated to the rename register ID.

19. The register rename unit as recited in claim 18, wherein the control logic is further configured to prevent the given instruction from proceeding in a pipeline of the processor.

20. The register rename unit as recited in claim 19, wherein in response to detecting the given instruction is ready to commit, the control logic is further configured to decrement the count associated with the given rename register ID.

* * * * *